(12) United States Patent
Eaton

(10) Patent No.: X1383
(45) Date of Patent: Oct. 29, 1810

(54) DISTILLING, BOILER, & RECTIFYING STILL

(76) Inventor: William Eaton

United States Patent

Patent No.: X1383 ule referred to in these Letters patent and making part conp- description in the words of the said William Eaton himself of his improvements in the Water invented by Timothy Kirk and in the or differing Stills patented to William Chamberlain These improvements are in the form of the pipe which carries the liquor from the boiler in a Still and in placing them so as to communicate the heat to three, four, or five or more vessels at the same time, and from the same fire. In the fitting a Vapor head to Timothy Kirk's boiler & converting it into a Still. And in introducing into modifying Stills of Mr Chamberlain, or any other Still, a bottle, or the perforated vessel or vessels which contain grain or other substance from which the spirit or volatile extract the bil ed of these improvements consists in forming the pipe connection similar with the, in a spiral manner, so as to expose the greatest surface of tube to the heat being one deck spirals tube in each such boiler or vessel at different heights, so as to circulate a circulation through the tube. These tubes may be placed in the most convenient places to in- in the boiler or consists in the application of a head of a tube or tubes within the boiler or vessel to be distilled upon the boiler, and the improvement also to line that part of a vessel with tin or some other metal, to prevent the e n ces of the vapour into spirit or volatile extract ent which is applicable to Stills of every description can ists in be perforated bottle within the body of the Still, wherein may be of substance which in the ordinary process of distillation might the Still and render the product impure William Eaton Witness
Jesse
Ann Thornton
Lyons (the original being so mutilated) by vermin, a perfect copy could not be taken, — the copy was on the original shewing such the fact.

(220 Words)

Expl
1846